No. 636,375. Patented Nov. 7, 1899.
C. BEARIKS.
GARDEN SPRAY.
(Application filed Jan. 19, 1897. Renewed Mar. 18, 1899.)

(No Model.) 2 Sheets—Sheet 1.

WITNESSES
"J. Frank Culverwell"

INVENTOR
Charles Beariks,
By
Attorney

No. 636,375. Patented Nov. 7, 1899.
C. BEARIKS.
GARDEN SPRAY.
(Application filed Jan. 19, 1897. Renewed Mar. 18, 1899.)
(No Model.) 2 Sheets—Sheet 2.

WITNESSES
"J. Frank Culverwell"

INVENTOR
Charles Beariks.
By John Hedderburn
Attorney

UNITED STATES PATENT OFFICE.

CHARLES BEARIKS, OF PESHTIGO, WISCONSIN.

GARDEN-SPRAY.

SPECIFICATION forming part of Letters Patent No. 636,375, dated November 7, 1899.

Application filed January 19, 1897. Renewed March 18, 1899. Serial No. 709,672. (No model.)

*To all whom it may concern:*

Be it known that I, CHARLES BEARIKS, a citizen of the United States, residing at Peshtigo, in the county of Marinette and State of Wisconsin, have invented certain new and useful Improvements in Garden-Sprays; and I do hereby declare the following to be a full, clear, and exact description of the invention, such as will enable others skilled in the art to which it appertains to make and use the same.

My invention relates to portable sprayers.

My object is to provide an extremely simple and cheap device of the class described, which can be readily attached to the person and carried about for use as a plant-sprayer or adapted for other purposes, as will appear more fully from the following description.

Figure 1:
Figure 2:
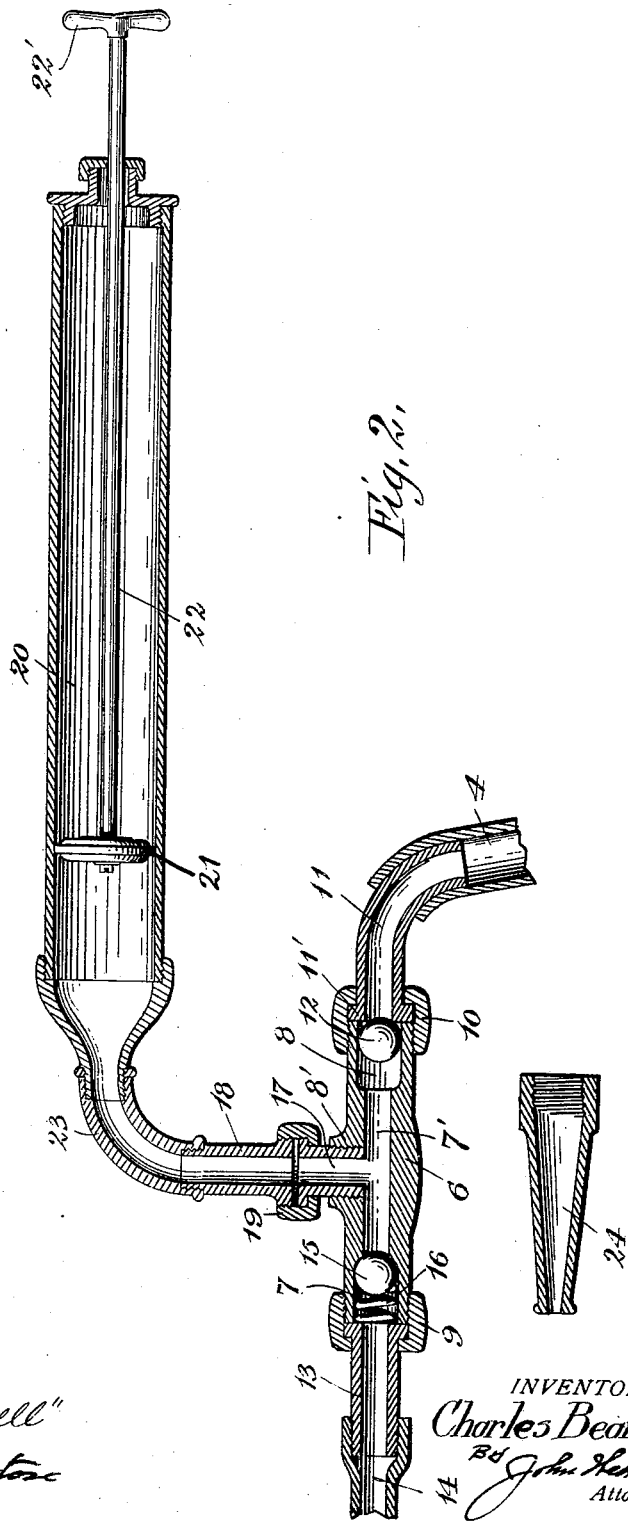

In the accompanying drawings, Figure 1 is a view showing the device in use, and Fig. 2 a detail view.

The numeral 1 designates a tank which is provided with a closure 2 at its upper end, so that it may be readily filled whenever desirable. Two straps or bands 2 and 3 have their ends connected to the tank and are adapted to be passed around the shoulders of the person, as clearly shown in Fig. 1. This tank holds the fluid which is to be applied, and its size will be regulated according to the requirement.

The numeral 4 designates a flexible pipe which is connected to a globe-valve 5, secured to the tank. There is a valve-casing 6, which is provided with similar pockets 7 and 8 at its ends and has said ends externally screw-threaded. It is provided with a longitudinal fluid-passage 7' and an internally-screw-threaded boss 8'.

The numerals 9 and 10 designate couplings which screw on the ends of the casing 6. There is a coupling-pipe 11 fitted into the flexible pipe 4 and provided with a collar 11', received in the coupling 10. A ball-valve 12 is adapted to play in the pocket 8 and to seat itself against the end of the coupling-pipe 11. Another coupling-pipe 13 is employed, which is adapted to turn in the coupling 9, and the numeral 14 designates a pipe which terminates in a sprayer 14' at its lower end, said pipe being screwed to the coupling-pipe 13.

The numeral 15 designates a ball-valve free to move in the socket 7 and which is kept urged inwardly by a coil-spring 16. There is a coupling-pipe 17 screwed into the boss 8', and I also employ another coupling-pipe 18, the pipes 17 and 18 being secured together by the coupling-nut 19, so that they can turn in relation to each other.

The numeral 20 designates a pump-barrel in which moves a piston 21, to which is connected a rod 22, terminating in a handle 22'. This pump-barrel is connected to the coupling-pipe 18 by the coupling 23.

At 24 I have shown a nozzle of ordinary construction, which can be screwed onto the coupling-pipe 13 in lieu of the pipe 14 and sprayer 14', if desirable.

The operation is as follows: The globe-valve 5 is first opened, whereupon the water runs down to the pump. The operator then pulls on the handle 22', whereupon the ball-valve 12 opens and the water is drawn into the pump. When the handle is pushed open, the said valve closes and the valve 15 opens and the water is forced through the pipe 14 and sprayer 14'. The device is well adapted for use in spraying garden-plants to keep insects off or prevent the same from attacking the plants, and it can also be used in a variety of connections, such as washing windows or as a fire-extinguisher. The pipe 14 can be disconnected and the nozzle screwed on in its place. The fluid, whether water or a spraying mixture, can be forced to a considerable distance. There are two ways of filling the tank. The closure 2 can be opened and the fluid directly poured in. On the other hand, if it is desired to fill the tank when the device is strapped to the person the pipe 4 can be disconnected from the pipe 11 and the pipe 14 from the pipe 13. The coupling-nut 19 is then loosened and the casing 16 given a half-turn. The pipe 4 is then connected to the pipe 13 and the pipe 14 with the pipe 11. The valves then operate in reverse order, and the water can be sucked up into the tank.

There are many slight changes which could be resorted to in constructing the present invention without detracting from any of the advantages thereof, and hence I do not limit myself to the precise construction herein shown and described, but consider that I am entitled to all such variations as properly come within the spirit and scope of the invention.

Having thus described the invention, what is claimed as new is—

In a device of the class described, the combination with a tank adapted to be connected to a person, of a valve-casing having a fluid-passage extending therethrough from end to end and provided with pockets in its end, ball-valves adapted to operate in said pockets and one of said valves constituting an entrance-valve and the other an exit-valve, a spring keeping said exit-valve normally seated, a pipe leading from the tank to the inlet-valve and flexibly connected thereto, a discharge-pipe flexibly connected to the casing and leading through the exit-valve, a pump, and a connection between the pump and the passage of the valve-casing, said connection being located intermediate the valves.

In testimony whereof I have signed this specification in the presence of two subscribing witnesses.

CHARLES BEARIKS.

Witnesses:
JAMES F. SLIGHT,
JAMES MELLEN.